Aug. 24, 1943.   P. E. WAUGH   2,327,475
LIQUID DISPENSING DEVICE
Filed June 5, 1939   5 Sheets-Sheet 5
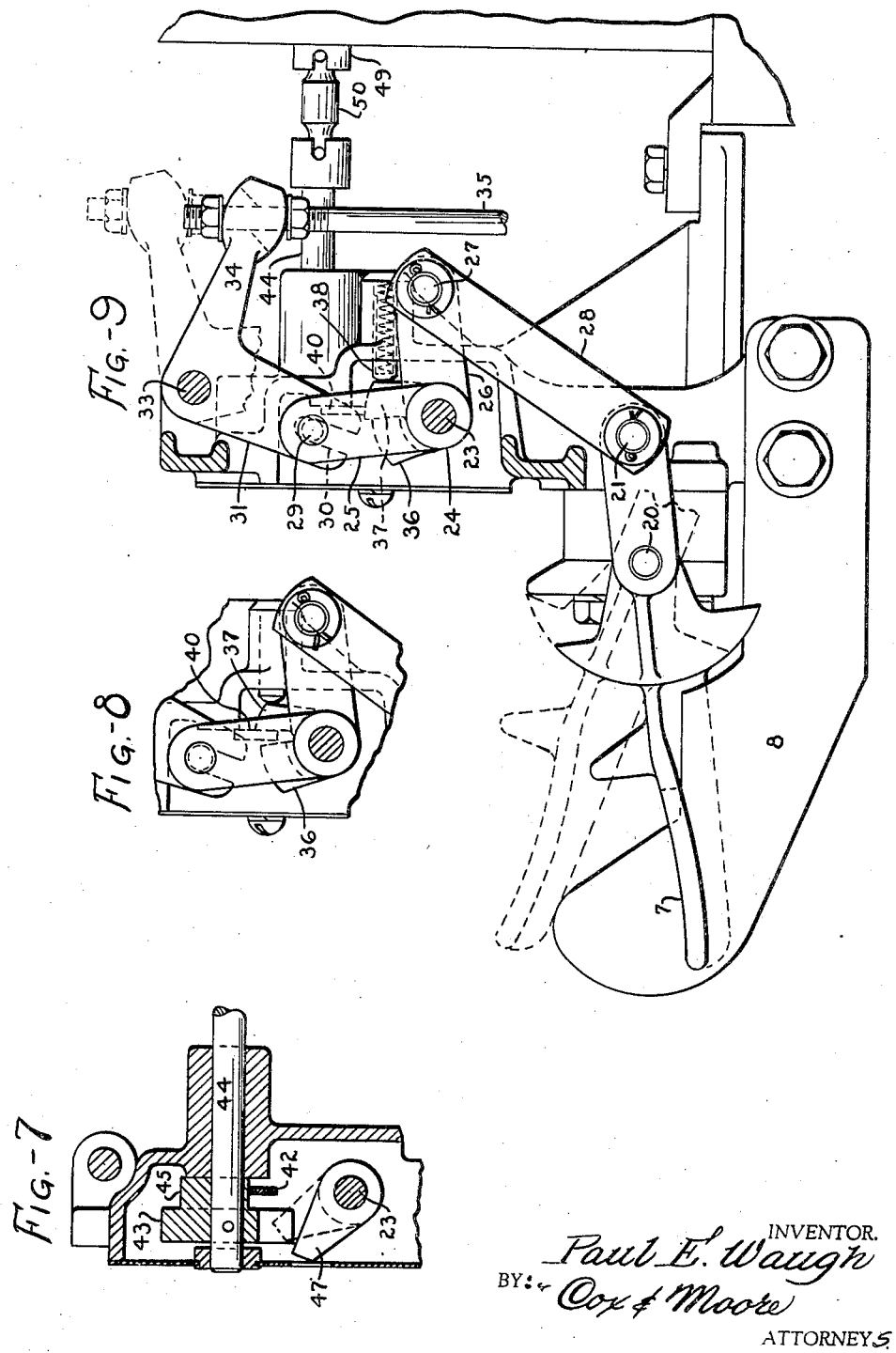
INVENTOR.
Paul E. Waugh
BY: Cox & Moore
ATTORNEYS

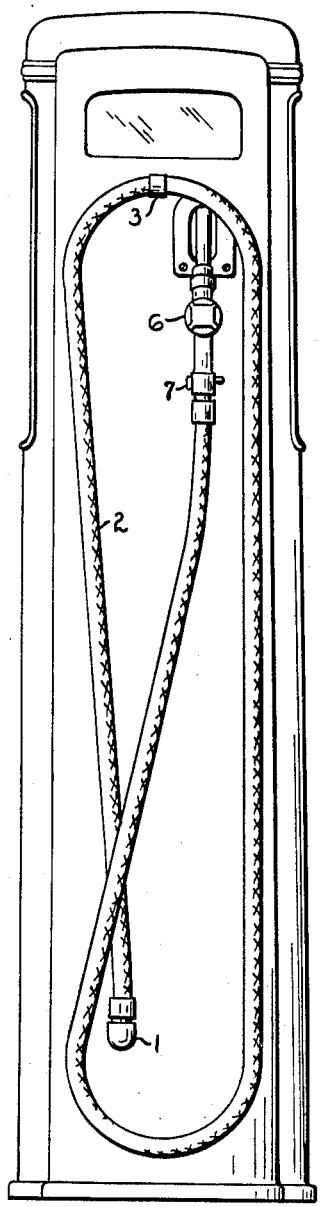

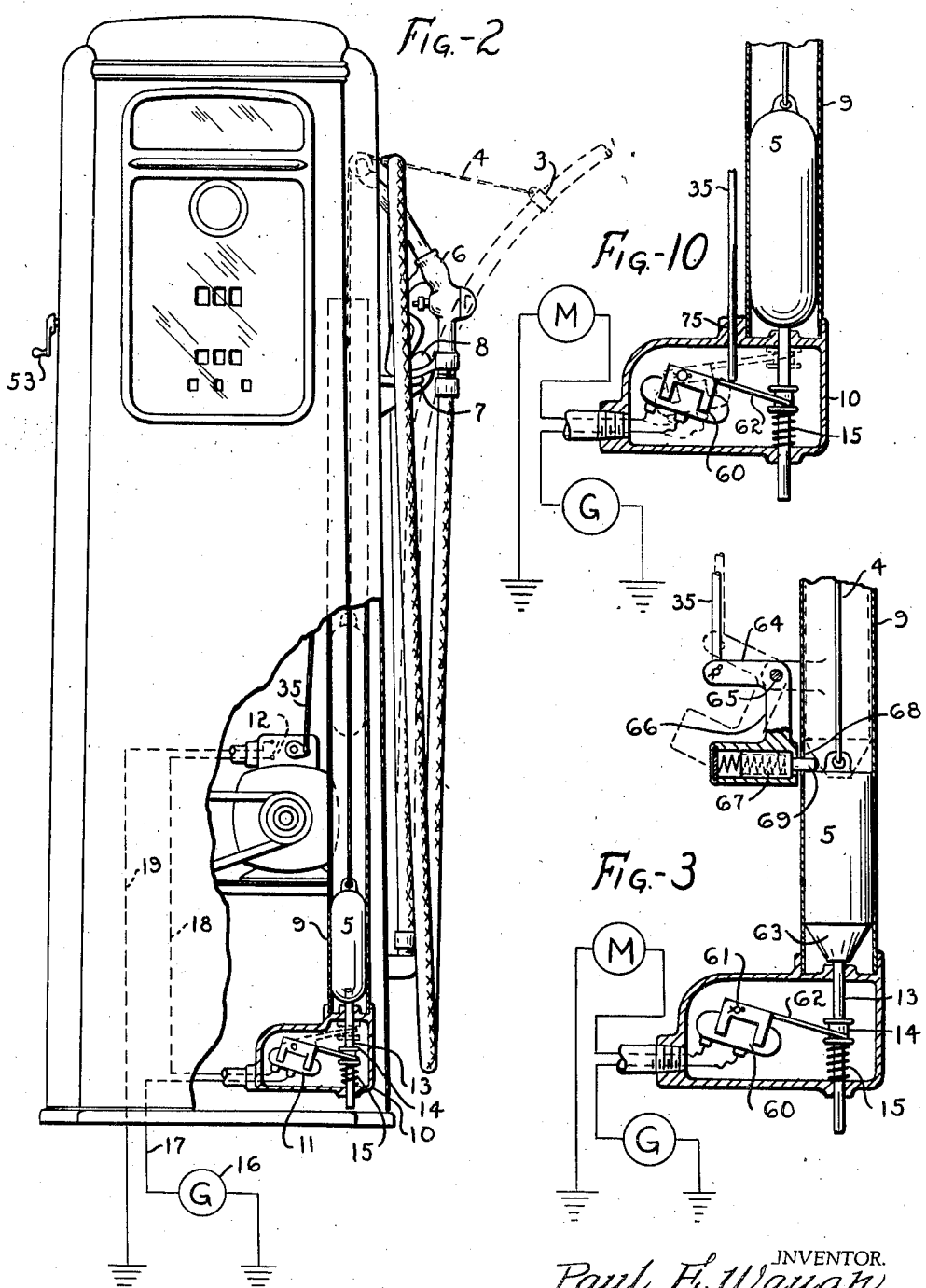

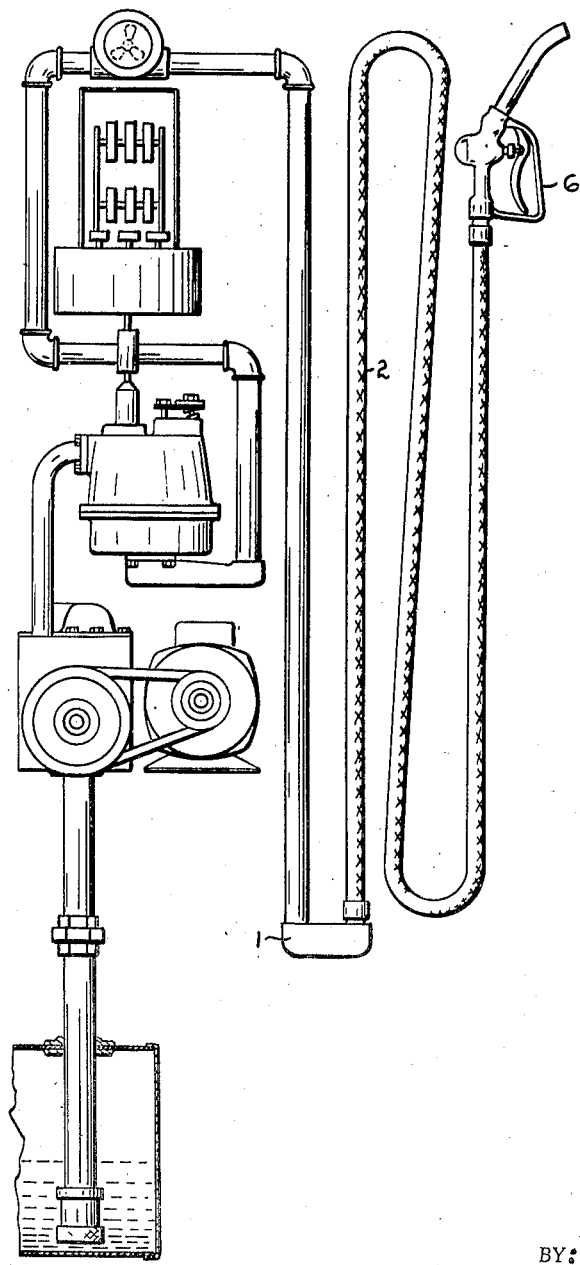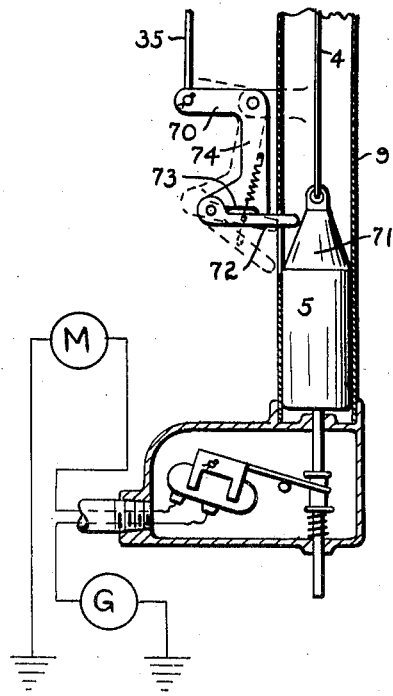

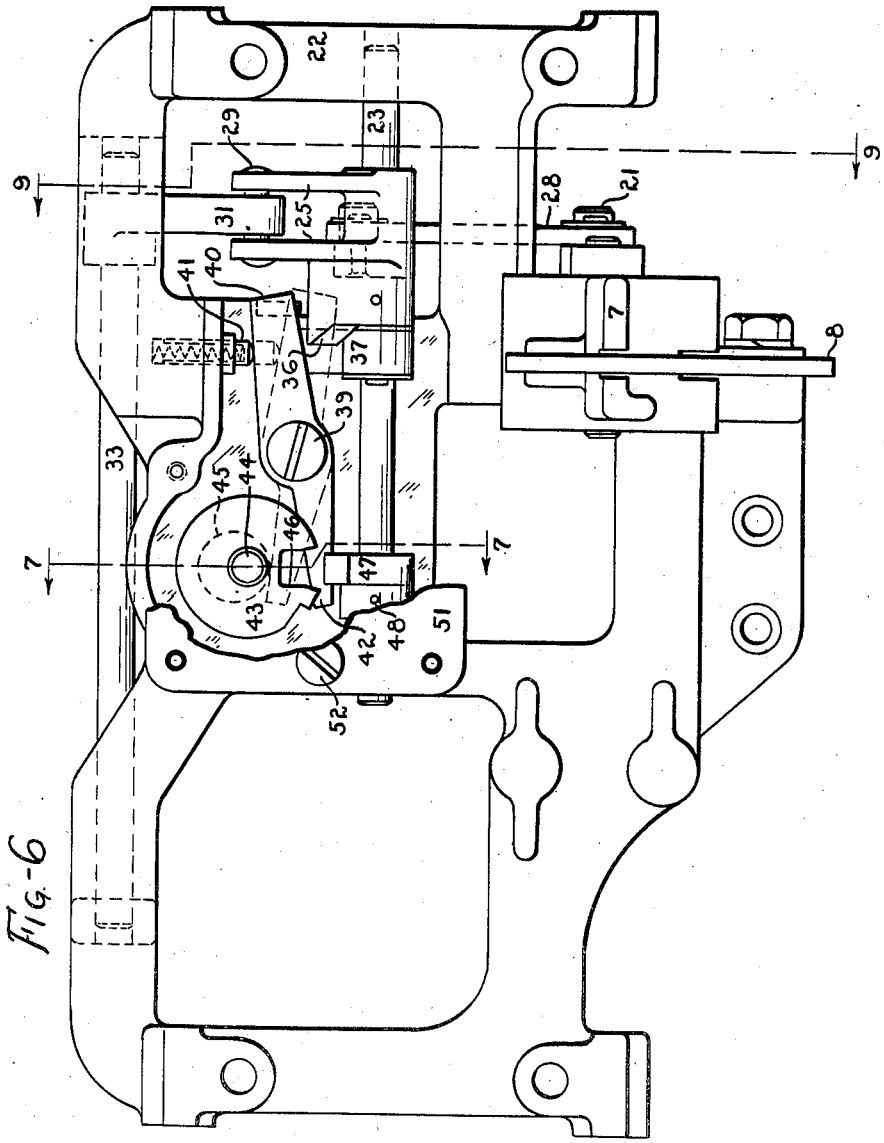

Patented Aug. 24, 1943

2,327,475

UNITED STATES PATENT OFFICE 2,327,475

LIQUID DISPENSING DEVICE

Paul E. Waugh, Fort Wayne, Ind., assignor to Tokheim Oil Tank and Pump Company, Fort Wayne, Ind., a corporation of Indiana Application June 5, 1939, Serial No. 277,341

2 Claims. (Cl. 221—95)

This invention relates to a liquid dispensing device and more particularly to control mechanisms of a power means for forcing liquid through the flow line of a dispensing apparatus.

The development of the present-day construction of automobiles has called for a longer hose than has heretofore been used in service station equipment pumps. Heretofore, the conventional length of hose has been ten feet. Many of the new designs of cars have their filling tanks arranged with the fill pipe thereof disposed in the fender, and several of the designs of cars have their tank fill pipes located on the right-hand side of the car so that when the cars are driven into a filling station on the right-hand side of the pumps, in many instances the conventional ten-foot hose will not reach these fill pipes. In addition, many of the cars having their fill pipes on the left-hand side of the car are driven in on the left-hand side of the service station pump, so that the same objection is presented. So also, many times a truck or automobile cannot pull sufficiently close to a dispensing pump to permit the conventional hose to reach the filling tank.

The present invention relates to the type of dispensing device shown in the pending application of Chester C. Oberly titled Liquid dispenser, Serial No. 250,388, wherein the flexible hose is connected to that portion of the dispensing line which is encased by the housing, substantially at the bottom of the housing, and wherein the hose is adapted to be permanently suspended on the outside of the housing and is provided with mechanism associated with the housing for supporting the hose in such a manner that alternatively a short length of hose, substantially ten feet, may be used in dispensing operation, or a longer length of hose, say fifteen feet more or less, may be used for reaching cars which are more remotely located with respect to the upstanding housing.

The present invention relates to a so-called pull hose control mechanism for the liquid dispensing means whereby the latter may be controlled by pulling upon the hose to initiate the dispensing operation and alternatively to stop the liquid forcing means when it is desired to stop the dispensing operation.

The invention is concerned with a hose support associated with a predetermined length of relatively long hose for supporting it when not in use on the housing and which supporting means is capable of extension or shifting movement relatively to the housing to permit either a shorter length such as the present-day conventional length of hose to be used or to permit a relatively longer or the full length of the hose to be used, and which is automatically operated by a pull upon the hose and is provided with means in the housing for automatically controlling the operation of the electric motor which operates the pump which forces the liquid through the dispensing line. In association with this mechanism there is provided an interlock with the registering mechanism for registering the volume and/or price of the liquid being dispensed and also a mechanism with a shiftable switch control on the exterior of the housing which connects with the electric motor switch whereby to accomplish certain novel functions hereinafter set forth.

Among the objects of the present invention are to provide a service station equipment pump of the hereinbefore described type which is constructed and arranged to permit the hose to be used either as a hose of conventional length or as a hose of substantially greater length, the arrangement being such that the hose whether used as of standard or greater length may operate as a pull hose for controlling the prime mover which operates the liquid forcing means of the service station pump; to provide a hose construction adaptable for use either as of the conventional length of hose or as of a longer length of hose with supporting means which functions normally to support the hose when not in use on the exterior of the housing and wherein such supporting means is cooperative with a mechanism disposed in the housing so that when the hose is used as either a shorter or a longer hose, a pull upon the hose shifts the supporting means relatively to the housing and the supporting means when thus shifted functions to control the electric motor or other means for driving the pump of the dispensing device or service station pump; to provide means associated with the foregoing and providing an interlock with the computer reset mechanism of the dispensing device and the nozzle support and shiftable switch lever of the device so that the switch lever may not be moved to a position to start the pump driving motor without first resetting to zero the computing mechanism; to provide a simple type of control mechanism associated with devices for supporting a hose of greater than the conventional length in such manner that a shorter or a longer length of hose may be used as desired and the control mechanism be maintained operative to accomplish the various functions hereinafter set forth; to provide these and other objects of invention as will be made apparent from a perusal of the following specification when taken in connection with the accompanying drawings.

Referring now to the drawings in detail:

Figure 1 is an external view of a gasoline pump of the type described having the improved control mechanism applied thereto.

Figure 2 is a front view of the same pump with a portion of the shell or housing broken away to show the operating section.

Figure 3 is a modified form of the control.

Figure 4 is still another modification of the control mechanism.

Figure 5 is a diagrammatical illustration of a conventional dispensing system provided with a long hose and with which the invention may be incorporated.

Figure 6 is a view of the interlock control which is disposed between the motor switch lever and the computer means.

Figure 7 is a sectional view taken on line 7—7 of Fig. 6.

Figure 8 is a view of the interlock in one of its positions.

Figure 9 is a sectional view taken on line 9—9 of Fig. 6.

Figure 10 is a sectional view of still another modified form of the switch control mechanism.

The invention is illustrated in connection with a conventional type of upstanding housing which is adapted to house all of the mechanism shown in Fig. 5 except the reservoir and the flexible hose. In Fig. 1 the housing is shown as provided with a preferably cast iron fitting 1 which extends through an opening in the lower part of the housing and is provided with a socket or connection for one end of the flexible hose 2. The hose 2 is considerably longer than the conventional length heretofore used. In the present instance the hose is substantially fifteen feet instead of the usual ten-foot length. The upper portion of the first length of hose is supported by a collar 3 which is attached to a wire or cable 4 which passes through an opening in the housing over a pulley and bends downwardly, being provided at its lower end with a weight 5. The remainder of the hose 2 hangs downwardly along one side of the upstanding housing and is looped about itself in an upwardly direction. It is provided on its discharge end with the usual type of nozzle 6 which is adapted to be supported upon the usual type of switch lever 7 and nozzle support 8. Nozzle support 8 is preferably stationary. The weight 5 slides vertically in a tube or cylinder 9 located within the housing. On the lower end of this tube a switch box 10 is connected to the lower end of the tube. Within the switch box 10 is a mercury switch 11 connected in series with a motor switch 12. Disposed in vertical position in the switch box is a shaft or rod 13 provided at an intermediate portion with a collar 14. Between the lower flange of the collar and the bottom of the switch box 10 is located a compression spring 15. A suitable source of current, preferably a generator 16, is shown connected by a wire 17 to the mercury switch 11, and the switch 12. The other side of switch 12 is connected by ground circuit wire 19.

The dispensing device is shown in Figures 2 and 5 with the usual type of volume and/or price computing and indicating mechanism for indicating at any instant the volume and/or price of the liquid being dispensed. This mechanism is of the usual conventional construction, and means such as a crank shown extending on the outside of the housing is provided for resetting the computing mechanism to zero position. Means is also provided in association with the resetting mechanism for providing an interlock so that after a first dispensing operation takes place and the computing wheels have been moved away from zero position, a subsequent dispensing operation cannot take place unless and until the computing mechanism has been reset to zero.

Referring now to Figs. 6 to 9, inclusive, the various parts of the interlock mechanism are shown. For instance, in Fig. 9 the motor switch lever 7 is shown as pivoted on pin 20 and on the extending arm of the switch lever pin 21. Journaled in bearings in the control bracket 22 is a shaft 23. On this shaft is attached operating mechanism 24 having two extending arms 25. Disposed at right angles is an arm 26 having located in its outer end a pin 27. Between pins 21 and 27 is disposed a connecting link 28. The levers 25 are adapted to support a pin 29 which is adapted to operate in slot 30 of arm 31 of a bell crank lever pivoted on a shaft 33. The bell crank lever has a laterally extending arm 34 attached to a rod 35 which rod connects to the motor switch 12.

Attached to the side of the lever arms 25 and acting as a part thereof, is a lug 36, the rear face of which contacts another lug 37 freely journaled on the same shaft 23. A spring pressed plunger 38 constantly urges lug 37 forwardly to contact with lug 36. Disposed in a central position of the control bracket 22 is a shoulder stud 39 about which a double ended lever 40 pivots. On the upper side of the right-hand end of the lever, a plunger and spring 41 are disposed for constantly urging the lever 40 in a downward or clockwise direction. Arm 42 of the lever is disposed in the rear of a disk 43. This disk is securely attached to a shaft 44 in turn operatively connected to the computer resetting shaft. The disk 43 is attached to an eccentric cam 45. The disk 43 has disposed in its lower portion a slot 46. On the left-hand side of shaft 23 a lug 47 is secured by pin 48. The shaft 44 is connected to the computer resetting shaft 49 by means of a coupling 50.

The supporting bracket 22 which is held by the supporting members of the pump frame in position has a cover plate 51 held in place by a screw 52. In Fig. 6 this cover plate is partially broken away to show the internal mechanism. It is to be understood that the resetting device just described is not novel per se except insofar as it enters into combination with certain of the other elements and as set forth in the claims.

In Figs. 6, 7 and 9, all the parts of the reset mechanism and interlock structure are shown in the positions which they occupy when the motor switch is open. Upon raising switch lever 7 (see Fig. 9) to the dotted line position, through the associated parts, the link 28 is rotated in a clockwise direction. It forces with it the lug 37 against the plunger 38 and allows the pivoted arm 40 (shown in Fig. 6) to be forced down by the spring pressed plunger 41 so as to ride on top of the lug 36. During this time the motor may be energized by pulling on the hose as hereinafter set forth and these associated parts will remain in their respective positions until the motor switch lever 7 is lowered. However, when the motor switch is turned on or off to operative position the shaft 23 is rotated which has attached by pin 48 a dog 47. This dog will rotate in a notch 46 of the disk 43 and remain in this position until the switch lever 7 is in its lowered position. As the disk 43 is securely fastened to the reset shaft of the computer the computing mechanism cannot be reset while this interference is in operative position.

When the switch lever 7 has once been lowered, through its various linkage and parts, it rotates the lug 36 from under the arm 40 which abuts against the extending face of the lug 37 and drops down into the position shown in Fig. 8. By the lowering of pivot lever 40 the opposite end 42 raises to contact the eccentric cam 45 and takes the position shown in the dotted line in Fig. 6. In this position it will be evident that switch lever 7 cannot be raised to operative position again because of the obstruction of lever 40 in front of the lug 36 which prevents its rotation in a clockwise direction. Therefore, the computer must first be reset as hereinabove described and during this resetting operation the eccentric cam 45 is rotated, which serves again to lower the arm 42 or raises the arm 40 above the lug 37, allowing it to pass below the same. At this time the motor switch lever 7 may then be actuated and another cycle performed.

Referring now to the operation of the device, when the attendant removes the nozzle 6 from its support 8, where such nozzle overlies the lowered switch lever 7, before said switch lever can be thrown to the dotted line position to start the motor, it is necessary first to reset the computing mechanism to zero position. This is accomplished by turning the crank 53 (see Fig. 2) in an anti-clockwise direction, substantially 405 degrees, at the end of which rotation it rocks back 45 degrees to its normal position. The interlocking switch and all its associated parts are then in the position shown in Figs. 2, 6, 7 and 9 and the computer element has been reset. The operator may then raise the switch lever 7 to the dotted line position shown in Fig. 9. This holds link 28 down and actuates the arms 25, 31 and 34 in their following relation. The arms 25 and 26 will rotate in a clockwise direction and through pin 29 the levers 31 and 34 will travel in an anti-clockwise direction and the lever 34 will assume the position as shown in the dotted line in Fig. 9. This raises the rod 35 which in turn closes switch 12 of the motor circuit. The attendant then may pull outwardly on the hose 2 and this action carries with it the collar 3 and pulls the wire 4 outwardly through the opening in the housing, thereby pulling the weight 5 up. Since the switches 11 and 12 are connected in series, the motor will not be energized by the operation of the switch lever 7 alone, but will only be energized when both switches are in closed positions. Therefore, when switch 12 has been closed, pulling out on the hose will raise the weight 5 and allow the spring 15 to raise shaft 13 together with its associated collar 14. This collar 14 carries with it an arm extending from the mercury switch 11, thus placing the mercury switch 11 in closed position. Hence, both switches are closed and the motor is energized to actuate the pump so that upon opening the nozzle valve the liquid will be forced by the pump through the flow line, through the flexible hose and out of the nozzle to accomplish the dispensing operation, and this flow of liquid through the flow line will actuate the meter as shown in Fig. 5 to actuate the computing mechanism as is well-known in the art. Upon the termination of the dispensing operation by the closing of the nozzle valve, release of the hose will permit the weight to descend and open the mercury switch 11 to break the motor circuit. When the nozzle is replaced upon the motor switch lever 7, the latter is lowered to accommodate the nozzle. As before stated, lowering of the motor switch lever 7 rotates the lug 36 from the arm 40 and the opposite end 42 of the lever 40 raises to contact the eccentric cam 45 so that the interlock mechanism is automatically actuated so that the switch lever 7 cannot again be raised because of obstruction of the lever 40 in front of lug 46 which prevents its rotation in a clockwise direction and this interlock must be removed by actuation of the computer reset shaft before the motor switch can again be raised for a subsequent operation of the motor for a subsequent dispensing operation.

In Fig. 3 I have shown a modified form of the invention wherein the motor (M) is shown as provided with a source of current designated, for instance at (G), preferably comprising a generator. To this circuit is connected a switch 60, preferably a mercury switch, which pivots on the pin 61 and has extending arm 62 operatively associated with the collar 14. The weight 5 in this modification is provided with a conical or cammed lower end 63. In this modification the rod 35 is connected to an arm 64 which pivots at 65 and is provided with a lower arm 66. Retained in this lower arm is a spring compressed plunger 67 adapted to pass through an aperture or slot 68 in the tube 9 which guides the weight 5. It will thus be seen that in this form only one switch is employed to operate the motor when the interlock has been cleared. By the resetting of the computer the switch lever may be raised in a normal manner and in so raising the switch lever rod 35 is raised and this in turn shifts arm 66 in a clockwise direction, thereby pulling the plunger 69 from above the weight 5. This being accomplished, the attendant may then actuate the motor switch by pulling on the hose 2 thereby raising the weight 5 through the wire or chain 4 and allowing the spring 15 to act and close the motor circuit through the switch 60. Thus, as long as the motor switch lever 7 is raised, the motor switch may be actuated to open or closed position as many times as desired. In normal operation the attendant allows the hose to seek its normal position, as shown in Figs. 1 and 2 and the weight takes its lower position and stops the motor, as shown in Fig. 3. The hanging up of the nozzle 6 lowers the lever 7 which in turn rotates arm 66 so that the plunger 69 may automatically be projected laterally above the weight 5. In this position the hose is locked and retains the weight from any outward movement until the computer has again been reset and also until the switch lever 7 has been manually raised. In this form, if the attendant should lower the switch lever by hand before allowing the weight 5 to come to rest on the switch lever shaft 13, the plunger 69 would be forced into the tube by the conical surface 63 of the weight 5. The hose may be released and the weight may pass the plunger 69 because of the cam-like surface on the bottom of the weight 5.

In Fig. 4 another modification is shown. This is along the lines of Fig. 3 in that it employs but one switch in the motor circuit and the rod 35 is connected to a central arm 70. The advantage of this form resides in the fact that the lever 7 will be automatically raised when the interlock has been cleared and upon the raising of the weight 5. On the upper end of this weight 5 it is provided with a cammed surface preferably in the form of a conical surface 71 which rides against a spring-retained lever 72. This lever abuts against a stop 73 on the arm 74. In the operation of this device the interlock mechanism can be cleared by the resetting of the computer, but the lever 7 need not be raised. The attendant need only pull outwardly on the hose and chain 4 to raise the weight 5. The raising of this weight cams out the lever 72 together with its supporting arm 74 and rotates arm 70 in a clockwise direction. This automatically raises the rod 35 and through the associated linkage and arms shown in Fig. 9 automatically raises the lever 7.

In Fig. 10 still another modification is shown employing but one switch. In this form rod 35 passes downwardly along the side of the tube 9 and enters the switch box 10 through an opening 75. The lower end of this rod reciprocates above the switch arm 62. In this form, when the switch lever has been raised, it also raises the rod 35. The weight 5 is now free to be raised and the switch 60, by means of the spring 15, will be tipped to closed position. In this form the rod 35 serves only as a lock for the motor switch 60 and the weight 5 may be raised at any time by the hose 2 but will not allow the switch to operate until the rod 35 has been raised with the switch lever 7.

The invention is hereby claimed as follows:

1. In a service station liquid dispensing device, an upstanding housing, a dispensing line mounted in said housing and having a portion extending from the housing adjacent the bottom thereof, a pump in said line and mounted in said housing, an electric motor in said housing for driving said pump, a flexible hose connected at one end to the portion of said line which extends out of the housing adjacent the bottom of said housing, said hose normally extending along an outside wall surface of said housing in a looped form of at least three flights, said hose having at its other free end a dispensing nozzle, said housing having a shiftably mounted support detachably receiving said nozzle to support the free end of the hose when not in use, said housing having an opening in its upper portion, yieldable and retractable means receiving the upper looped portion of said hose to support the hose against the outer wall surface of the housing, said yieldable and retractable means having a flexible cable passing through the opening in the housing and extending downwardly within said housing, a weight on the lower end of said cable, a switch controlling the motor, switch operating mechanism controlled by said weight for shifting the switch to open position upon the movement of said weight to lowered position as the hose is retracted and for shifting the switch to closed position upon initial movement of said weight upwardly as the hose is yielded, and means shifting the nozzle support upon detachment of the nozzle from the support, a second switch connected to the switch controlling the motor and connected to said nozzle support for preventing energization of the motor by a pull on the hose when the nozzle is on the nozzle support and for deenergizing the motor when the nozzle is placed on the nozzle support.

2. In a service station liquid dispensing device, an upstanding housing, a dispensing line mounted in said housing and having a portion extending from the housing adjacent the bottom thereof, a pump in said line and mounted in said housing, an electric motor in said housing for driving said pump, a flexible hose connected at one end to the portion of said line which extends out of the housing adjacent the bottom of said housing, said hose normally extending along an outside wall surface of said housing in a looped form of at least three flights, said hose having at its other free end a dispensing nozzle, said housing having a shiftably mounted support detachably receiving said nozzle to support the free end of the hose when not in use, said housing having an opening in its upper portion, yieldable and retractable means receiving the upper looped portion of said hose to support the hose against the outer wall surface of the housing, said yieldable and retractable means having a flexible cable passing through the opening in the housing and extending downwardly within said housing, a weight on the lower end of said cable, a switch controlling the motor, and switch operating mechanism controlled by said weight for shifting the switch to open position upon the movement of said weight to lowered position as the hose is retracted and for shifting the switch to closed position upon initial movement of said weight upwardly as the hose is yielded, and means for shifting said nozzle support upon detachment of said nozzle, means for latching said weight in lowered position, and means operatively connected to said shiftable nozzle support for releasing said latch upon detachment of said nozzle upon said nozzle support.

PAUL E. WAUGH.